US008650765B2

(12) United States Patent
Smith (10) Patent No.: US 8,650,765 B2
(45) Date of Patent: *Feb. 18, 2014

(54) ALIGNMENT TOOL AND METHOD OF CHECKING WHEEL ALIGNMENT

(76) Inventor: Dennis K. Smith, Anderson, CA (US)

( * ) Notice: Subject to any disclaimer, the term of this patent is extended or adjusted under 35 U.S.C. 154(b) by 265 days.

This patent is subject to a terminal disclaimer.

(21) Appl. No.: 12/929,791

(22) Filed: Feb. 16, 2011

(65) Prior Publication Data

US 2011/0203126 A1 Aug. 25, 2011

Related U.S. Application Data

(63) Continuation-in-part of application No. 12/588,124, filed on Oct. 6, 2009, now Pat. No. 7,913,404.

(51) Int. Cl.
*G01B 5/24* (2006.01)
*G01C 9/14* (2006.01)

(52) U.S. Cl.
USPC .................................. 33/203.18; 33/DIG. 21

(58) Field of Classification Search
USPC ......... 33/203, 203.15, 203.18, 203.19, 203.2, 33/365, DIG. 21
See application file for complete search history.

(56) References Cited

U.S. PATENT DOCUMENTS

| 4,006,532 | A | * | 2/1977 | Hallman | 33/288 |
| 4,771,546 | A | * | 9/1988 | Cavazos | 33/203.18 |
| 6,622,389 | B1 | * | 9/2003 | Pellegrino | 33/203.18 |
| 6,751,879 | B1 | * | 6/2004 | Pu | 33/DIG. 21 |
| 7,913,404 | B1 | * | 3/2011 | Smith | 33/203.18 |
| 2006/0225293 | A1 | * | 10/2006 | Godwin | 33/264 |
| 2008/0271329 | A1 | * | 11/2008 | Voecks | 33/345 |
| 2010/0186244 | A1 | * | 7/2010 | Schwindt | 33/288 |
| 2012/0117812 | A1 | * | 5/2012 | Gray et al. | 33/203.18 |

* cited by examiner

*Primary Examiner* — G. Bradley Bennett
(74) *Attorney, Agent, or Firm* — Breiner & Breiner, L.L.C.

(57) ABSTRACT

An alignment tool and method is disclosed for use in aligning wheels of trucks and truck trailers. The tool includes at least one self-leveling laser for checking wheel alignment. The self-leveling laser includes a body, an attachment member and a laser. The attachment member secures the alignment tool to the vehicle or trailer and the alignment tool provides for self-leveling to enable a user to make various predetermined measurements from the laser marking "+" when aligning the wheels of the vehicle or trailer. The alignment tool also may include a fifth wheel adapter for attaching the alignment tool to a fifth wheel pin of a truck trailer when checking the alignment of a truck trailer.

17 Claims, 9 Drawing Sheets

ALIGNMENT TOOL AND METHOD OF CHECKING WHEEL ALIGNMENT

RELATED APPLICATION

This is a continuation-in-part of application Ser. No. 12/588,124, filed Oct. 6, 2009 now U.S. Pat. No. 7,913,404, entitled "Alignment Tool and Method of Checking Wheel Alignment," which application is incorporated in its entirety herein by reference and claims priority thereon pursuant to 35 U.S.C. §120.

FIELD OF THE INVENTION

The present invention is an alignment tool for checking wheel alignment of a vehicle or a truck trailer and a method of checking wheel alignment. More particularly, the alignment tool is simple, compact and inexpensive and provides a method of checking wheel alignment of heavy trucks and truck trailers in a quick and accurate manner.

BACKGROUND OF INVENTION

Vehicles need to be regularly maintained to remain in good working condition. This is particularly true of heavy trucks and truck trailers. They require continual oversight due to the heavy loads and number of miles placed on the wheels and tires of the vehicles. Accordingly, truck and trailer wheels need to be kept in alignment for the truck and trailer to perform in an efficient and safe manner. The correct alignment of truck and trailer wheels saves on the wear of tires which, next to fuel, is the number two expense in keeping a truck fleet on the road.

There are a number of alignment tools on the market. However, the traditional market alignment tools are bulky, complicated, difficult and/or time-consuming to use or just too expensive.

Accordingly, there is a need for an alignment tool which is compact, easy to use and inexpensive while providing the ability to check wheel alignment in a quick, easy and accurate manner.

OBJECTS AND SUMMARY OF THE INVENTION

The present invention is a wheel alignment tool for checking the wheel alignment of a vehicle or truck trailer. Further, the present invention includes a method of checking the alignment of vehicle and trailer wheels. The alignment tool is particularly useful for aligning wheels of heavy trucks and aligning wheels of truck trailers. The alignment tool is simple in construction, compact, easy to use and inexpensive. The alignment tool and method of checking alignment enables a user to make various predetermined wheel measurements in a quick and accurate manner so that the user can properly align the wheels of a vehicle or trailer.

In a preferred embodiment, the alignment tool comprises at least one, and preferably four, self-leveling lasers; at least one fifth wheel adapter; at least one, and preferably two, steel bars or related accessories as discussed hereafter; and a measuring tape. As seen from the description of the invention hereafter, certain of these components are necessary for aligning the vehicle wheels and certain of the components are necessary for aligning the wheels of a truck trailer. Thus, the alignment tool is useful in at least (1) checking the alignment of the front wheels and the frame of the truck; (2) ensuring that the front truck wheels and frame are tracking true to form; (3) ensuring that the rear truck axle is traveling straight with the truck frame; and (4) checking the alignment of a truck trailer, including the wheels on the front and rear axles of the trailer. If the vehicle or trailer is out of alignment as determined by the present invention, the vehicle or trailer is then put into alignment using the manufacturer's specifications and known alignment techniques.

As previously noted, the alignment tool includes a self-leveling laser, sometimes referred to herein as "SL Laser" or just "Laser," for attachment to the vehicle or trailer. The SL Laser comprises a body portion, a self-leveling attachment means for attaching the Laser to the vehicle and a laser light. The self-leveling function of the Laser ensures that the Laser is substantially vertical to the ground when attached to the vehicle to provide accurate measurements. This also allows the vehicle alignment to be checked when the vehicle is on both even and uneven surfaces. The Laser light preferably provides a "+" laser marking on the ground, thereafter enabling the user of the positioned Lasers to take various predetermined measurements to determine if the vehicle wheels are properly aligned. If the wheels are not in alignment, the measurements taken by the alignment tool invention provide the degree that the wheel is out of alignment and the wheel may then be aligned in accordance with the factory specifications of the truck tractor or truck trailer.

A primary object of the present invention is to provide an alignment tool which removably attaches to a wheel, an axle or another predetermined part of a vehicle and enables a user to make various predetermined measurements in a quick and accurate manner. These measurements are then used to align the wheels of the vehicle in accordance with the vehicle specifications.

Another primary object of the invention is to provide a method of checking truck and truck trailer wheel alignment. The method is quick and simple to undertake while providing accurate results. The method is an improvement over the current tools and methods which involve expensive and complicated tools and which can be time consuming.

Another primary object of the invention is to provide a laser tool for aligning vehicle wheels and truck trailer wheels which is self-leveling. The SL Laser of the invention allows for taking accurate measurements when checking wheel alignment. It also allows for taking these measurements on different surfaces.

Another primary object of the invention is providing a laser tool for checking wheel alignment which laser provides a "+" spot on the ground for taking the measurements. Most lasers provide a dot as opposed to "+," or those which provide a "+" marking are either expensive to make or the laser easily comes out of adjustment, e.g. when banged. The present invention provides a novel and inexpensive means for providing the laser "+" marking and which will stay in adjustment even when banged. The laser is mounted in the tool to move similar to a person's eye.

Another object of the invention is to provide accessories for easily and conveniently attaching the SL Laser to the truck or trailer wheel.

These primary and other objects of the invention will be apparent from the following description of the preferred embodiments of the invention and from the accompanying drawings.

BRIEF DESCRIPTION OF THE DRAWINGS

Referring to the drawings.

DETAILED DESCRIPTION OF THE PREFERRED EMBODIMENTS

Referring to FIGS. 1-11, the alignment tool and method of checking wheels of the present invention includes at least one SL Laser 20; at least one fifth wheel adapter 22; at least one straight steel bar 24 or related accessories as shown in FIGS. 12-18; and a measuring tape (not shown). As discussed above and seen below, these components are used in different arrangements depending on whether one is checking the alignment of a tractor truck wheel or a truck trailer wheel. Thus, when checking the alignment of a tractor truck wheel, the alignment tool uses the SL Laser, the steel bar and the measuring tape. When checking the alignment of the truck trailer wheel, the alignment tool uses the SL Laser, the fifth wheel adapter and the measuring tape.

Figure 10A:
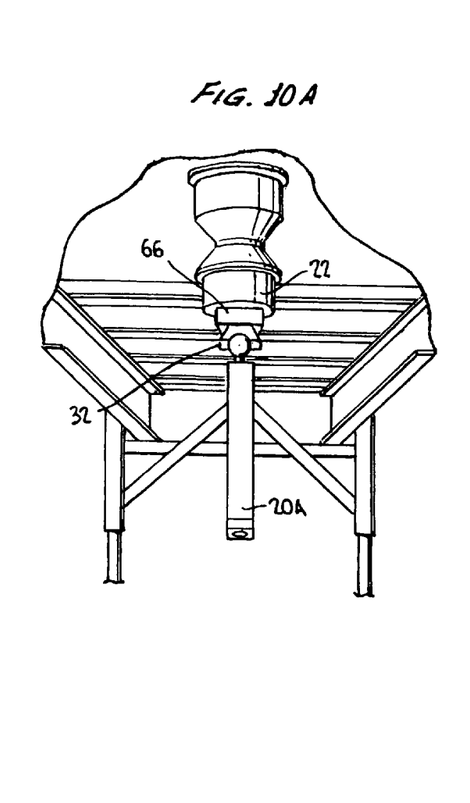
FIGS. 10A-10C are views of the alignment tool in use on a fifth wheel pin and the axles of a truck trailer to align the wheels of the trailer.
Figure 10B:
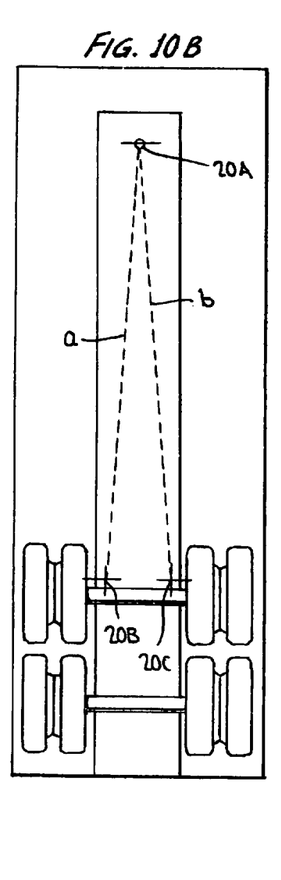
Figure 10C:
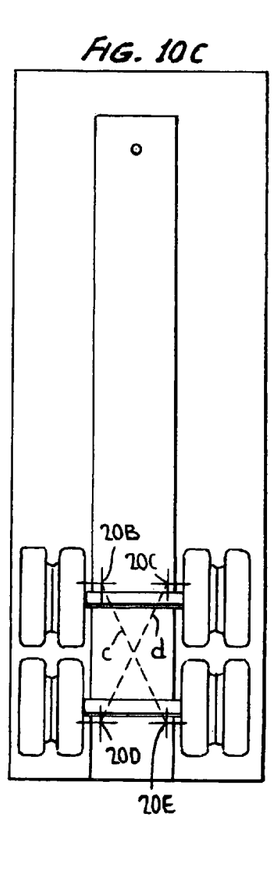

In a preferred embodiment, as shown for example in FIGS. 10 and 11, the alignment tool includes a plurality of SL Lasers 20, preferably four, for use in making predetermined alignment measurements.

The SL Laser 20 of the alignment tool is shown in a preferred embodiment in FIGS. 1-4. It is understood that the SL Laser may include different shapes, materials, and constructions than the preferred embodiment described herein as known to those skilled in the art without departing from the scope of the invention. The SL Laser 20 generally comprises a housing 30 including other components contained therein as described hereafter; a self-leveling attachment member 32 and a laser light assembly 34.

Housing 30 comprises a base 36 and cover 38. In the preferred embodiment housing 30 is made of plastic and is elongated, although other shapes and embodiments may be used (e.g. polygonal, square or spherical). The housing includes ends 40 and 42, and top, bottom and side walls. Cover 38 includes openings 44 and 46. Cover 38 provides a user with access to the interior of the housing 30. Cover 38 is removably secured to the base 36 by any suitable fastening members 47, e.g. screws.

Figure 3:
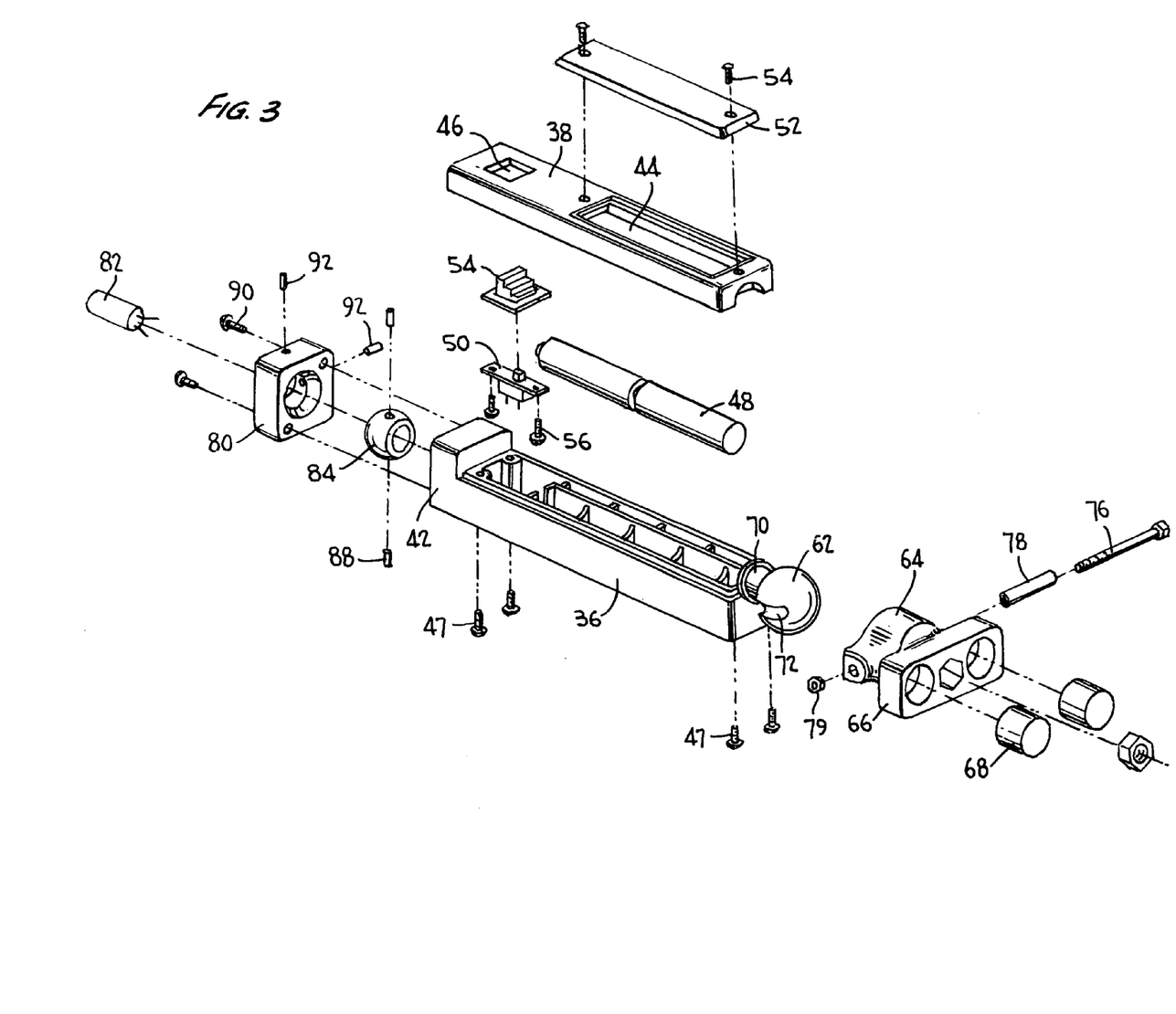
FIG. 3 is an exploded perspective view of the alignment tool of FIG. 1.
Figure 4:
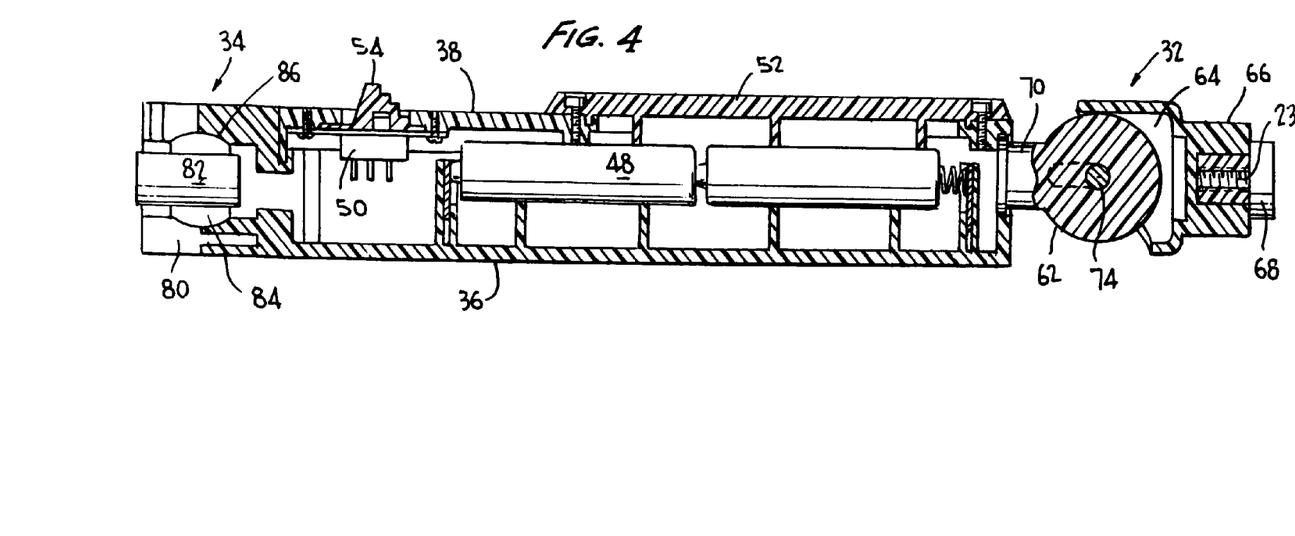
FIG. 4 is a cross-sectional view of the alignment tool along the line 4-4 of FIG. 1.

Housing 30 includes therein a power source 48 and switch means 50 connected to the power source 48 for operating the laser light. The power source in the preferred embodiment is one or more batteries, although other known power sources may be used without departing from the scope of the invention. Opening 44 in the cover 38 is adjacent to power source 48 for access thereto and is closed by any suitable cover 52. Cover 52 is removably secured by any suitable fastening members 54, e.g. screws.

Self-leveling attachment member 32 is secured to the end 40 of the housing 30. In a preferred embodiment, the attachment member 32 is any suitable member which is constructed and arranged to removably attach the alignment tool 20 to a wheel, an axle, frame or another part of a vehicle or trailer. The attachment member 32 when connected to the vehicle or trailer is constructed and arranged to be self-leveling, thereby providing the correct position of the laser light on the surface adjacent the vehicle or trailer as described hereafter. As noted above, this is important to taking accurate measurements and allows for checking of the vehicle alignment on different surfaces.

The attachment member 32 connects to end 40 of the housing 30 by a ball and socket assembly 60 having a ball member 62 and socket member 64. Socket 64 includes a housing 66 having one or more connecting members 68, which in the preferred embodiment are two magnets. The magnets allow for the attachment of the SL Laser to a vehicle or trailer as described hereafter.

While the attachment member 32 may be secured to the housing 30 by any suitable means, a preferred embodiment is the ball and socket assembly 60. The ball member 62 is positioned at end 40 of the housing 30 via a shaft 70. The socket member 64 receives ball member 62. Ball member 62 includes openings 72 at each side thereof and an annular open shaft 74 in the center thereof. Socket 62 is secured to ball 64 by alien pin 76 extending through openings 72 and annular shaft 74 in conjunction with sleeve 78 and nut 79, although other fastening members may be used.

The ball and socket assembly provides pivotal movement between the housing 30 and the attachment member 32 of the SL Laser 20 so that the alignment tool may be attached to a vehicle or trailer to enable a user to make the predetermined measurements required for the user to align the wheels of the vehicle. The ball and socket assembly 60 renders the alignment tool self-leveling and when attached to the vehicle or trailer will be substantially vertical to the ground.

Laser assembly 34 is connected at end 42 of the housing 30. As shown for example in FIGS. 2-4, end 42 of the housing 30 includes a cover 80 which retains laser 82 in housing 30. Laser 82 is held in place by any suitable member. In the preferred embodiment, the laser 82 is secured in place by a ball joint 84, as shown for example in FIGS. 3 and 4. Ball joint 84 seats in beveled wall 86. Further, the laser 82 is securely held in position in the ball joint 84 by one or more fastening members 88, such as allen screws. It has been found that ball joint 84 securely holds laser 82 in place. This is important in order to keep the laser light spot "+" in proper adjustment when in use, and to stay in adjustment if the tool is dropped or banged, common when checking alignment on trucks and trailers.

Once the laser 82 is secured in the ball joint 84, the ball joint 84 is secured to the end 42 by cover 80. Cover 80 is attached to the end 42 to secure and position the laser assembly 34 in a predetermined position in the end 42 of the housing 30. Cover 80 is attached to end 42 by any suitable fastening members 90, e.g. screws. The end of laser light 82 is further held secure and in adjustable alignment by alien screws 92.

The power source 48 is operated by any suitable control mechanism such as a switch means 50. Switch means 50 is located in the housing 30 between the power source 48 and the laser 82 to control the power supply from the power source 48 to the laser 82. The switch means 50 includes a slidable switch button 54 positioned on the outside of the housing 30 to enable the user to turn the laser 82 on or off by sliding the button 54. Switch means 50 is secured to the inside of the base 32 by one or more fastening members 56. Switch button 54 extends from the switch means 50 to the exterior of the alignment tool through opening 46 in cover 38.

As shown in FIGS. 5-9, the alignment tool also includes at least one fifth wheel adapter 22. The fifth wheel adapter is used when checking the alignment and aligning a truck trailer. It is inserted in the fifth wheel pin of the trailer and a SL Laser is attached thereto as discussed below.

The fifth wheel adapter 22 may be constructed and arranged in any suitable configuration. A preferred embodiment of a fifth wheel adapter 22 is shown for example in FIGS. 5-9. The fifth wheel adapter 22 is preferably round in shape, although it may be any suitable shape (e.g. polygonal, square or the like). A preferred embodiment of the fifth wheel adapter 22 includes a housing 100 comprising a base 102 and a cover 104, an adapter pin 106, at least one magnet 108 and a spring 110. The fifth wheel adapter 22 may also further include a nut 112, fastening members 114 and washers 116 and 118.

The base 102 and the cover 104 form the housing and may be made of any suitable material including, but not limited to, plastic, metal or the like. Plastic is used in the presently preferred embodiment because of ease of formation and expense. The base 102 and cover 104 are secured together by any suitable fastening members 114 such as screws in the preferred embodiment.

Figure 1:
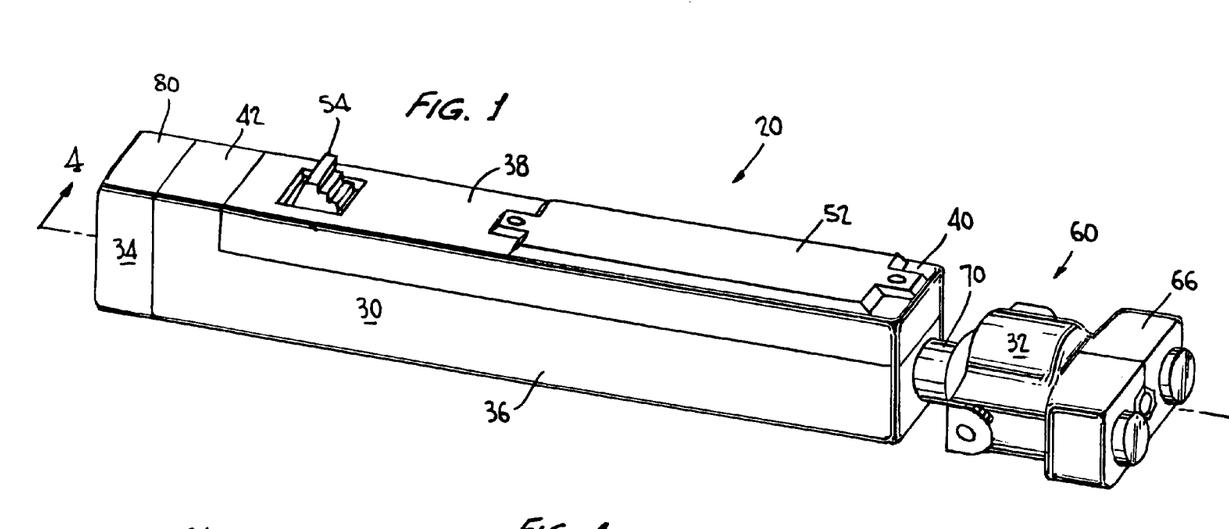
FIG. 1 is a top perspective view of an embodiment of a Laser of the alignment tool of the present invention.
Figures 2, 6, 7, 8, 9:
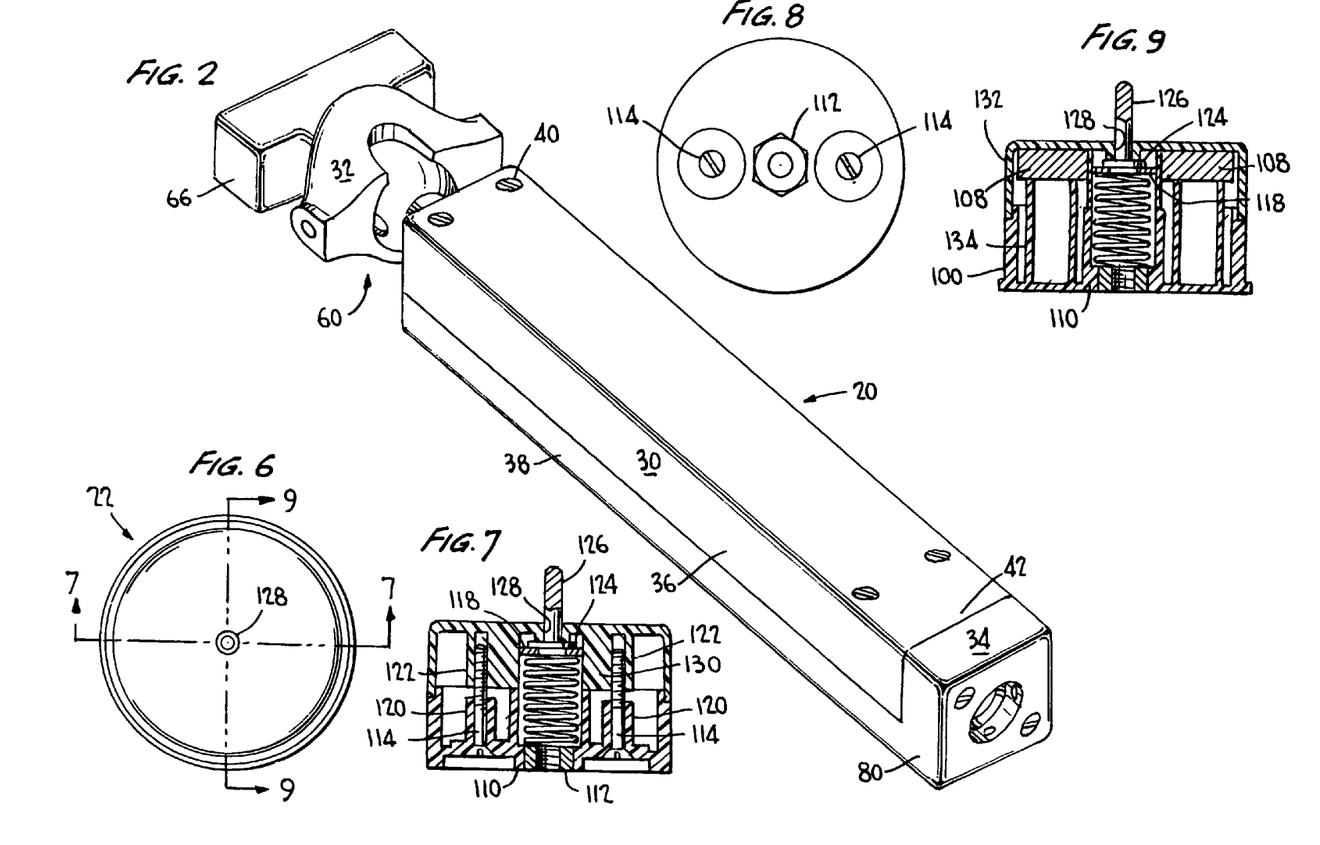
FIG. 2 is a bottom perspective view of the alignment tool of FIG. 1.
FIG. 6 is a top view of the fifth wheel adapter of FIG. 5.
FIG. 7 is a cross-sectional view of the fifth wheel adapter along the line 7-7 of FIG. 6.
FIG. 8 is a bottom view of the fifth wheel adapter of FIG. 5.
FIG. 9 is cross-sectional view of the fifth wheel adapter along the line 9-9 of FIG. 6.
Figure 5:
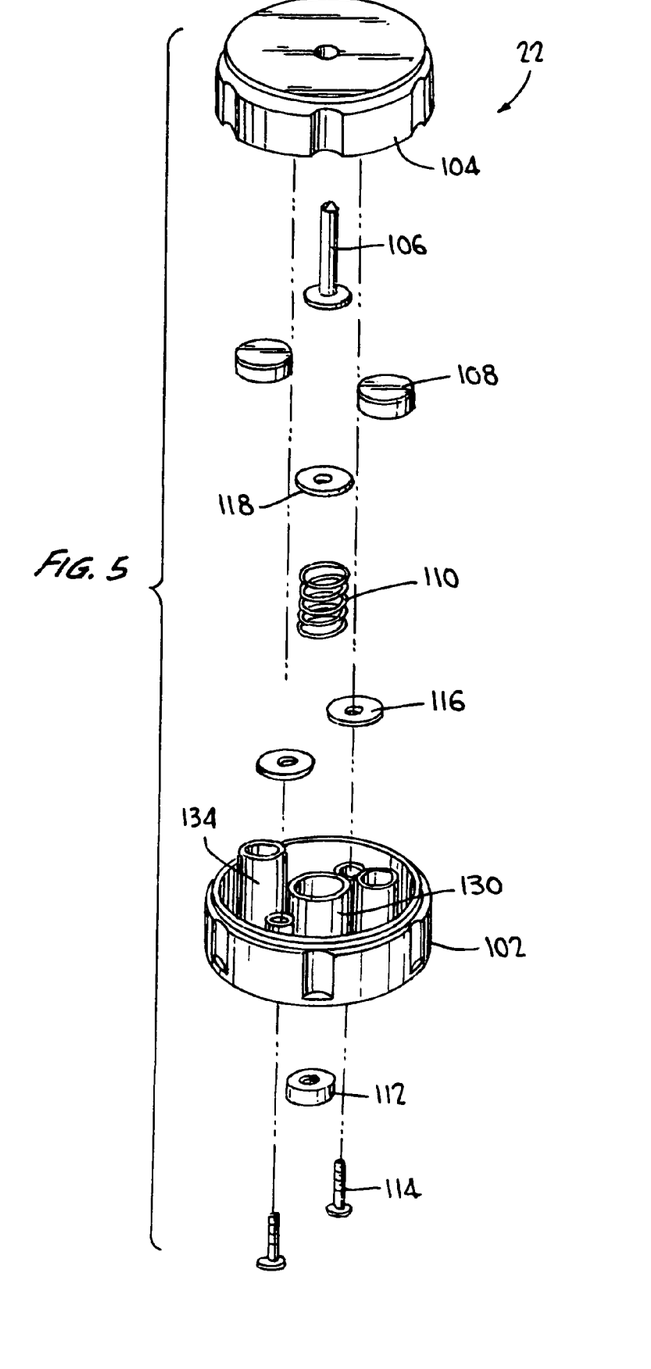
FIG. 5 is an exploded perspective view of an embodiment of a fifth wheel adapter of the alignment tool of the present invention.

Washers 116 are positioned on a shaft of the fastening member 114 in base 102 and held in place by annular grooves 120. Fastening members 114 are received by female threaded member 122 in cover 104.

The adapter pin 106 is any suitable pin element which aids in securing the fifth wheel adapter 22 to a fifth wheel pin on a trailer. In a preferred embodiment, the adapter pin 106 includes a substantially flat base 124 and a pin member 126. The adapter pin 106 is positioned adjacent to the interior of the cover 104 such that the base 122 remains in the interior of the housing and the pin member 126 extends through an opening 128 in the cover 104, as shown for example in FIGS. 7 and 9.

The fifth wheel adapter 22 further includes a spring 110 positioned between the flat base 124 of the adapter pin 106 and the interior of the base 102 in annular shaft 130, as shown for example in FIGS. 5, 7 and 9. The spring 110 holds the adapter pin firmly in position. A washer 118 is positioned between the flat base 124 of the adapter pin 106 and a first end of the spring 110 to provide space between and/or to distribute the load of these components. Nut 112 is positioned in base 102 adjacent an end of the spring 110 and holds spring 110 in the housing.

Magnets 108 in the fifth wheel adapter 22 are held firmly in the interior of cover 104 by annular recesses 132 and shafts 134. The magnets 108 aid in attaching the alignment tool to the fifth wheel pin of the trailer.

While a preferred embodiment of the alignment tool includes four SL Lasers 20, it is understood that less than four of the Lasers 20 may be utilized in taking measurements to check alignment, although such use would be more time consuming and less efficient.

Having described a preferred embodiment of the alignment tool, a preferred method of using the alignment tool for alignment of the wheels of a truck trailer will now be described with reference to FIGS. 10A-10C. A preferred method of using the alignment tool to align the wheels of a tractor trailer truck is shown for example in FIGS. 11A-11E.

FIGS. 10A-10C illustrate a preferred method of using the alignment tool when aligning the wheels of a truck trailer. To align the trailer, pull the trailer into the shop as straight as possible. The trailer brakes are locked and tension is pulled as if pulling a load. The trailer landing gear is lowered and the landing gear is made level. The tractor is then pulled from the trailer. The fifth wheel pin of the trailer is cleaned, for example, using a putty knife and rag. The fifth wheel adapter 22 is inserted into the fifth wheel pin on the trailer. The magnets 108 and pin 106 secure the adapter to the trailer. A first SL Laser 20A is then attached to the fifth wheel adapter 22 via the magnets of the Laser and the adapter. The SL Laser 20A is positioned level to the ground by self-leveling member 32, and hangs substantially vertically from the fifth wheel adapter 22, as shown for example in FIG. 10A. In this position, the Laser is turned on to provide an alignment point, in the preferred embodiment a "+," where the laser beam hits the ground. A user may mark this point with any suitable marking means such as chalk or the like, although this is not necessary, and the measurements are preferably made directly from the laser light "+" once all SL Lasers are in place. This alignment point is the centerline of the trailer.

Referring to FIG. 10B, SL Lasers 20B and 20C are next placed equal distance from the closest point of wheels on each side of the front axle. The user then measures from the fifth wheel pin Laser 20A to the Lasers 20B and 20C on left and right sides of the front axle, measurements a and b, respectively. This tells the user whether the trailer wheels are in alignment or not. If not, the trailer alignment is set to factory specifications using known alignment techniques.

Now referring to FIG. 10C, after the alignment of the front axle of the trailer is checked and aligned, if necessary, SL Lasers 20D and 20E are attached on each of the back side of the rear axle of equal distance. SL Lasers 20D and 20E similarly are self-leveling and hang substantially vertically from the rear axle and perpendicular to the ground. The Lasers 20D and 20E are turned on to provide alignment points "+" on the ground. The user may then take various measurements such as, but not limited to, as follows to align the wheels on the rear axle: measurement c—from SL Laser 20B to SL Laser 20E, and measurement d—from SL Laser 20C to SL Laser 20D. These measurements are used to check the alignment of the rear trailer axle and, if necessary, to thereafter adjust and align the wheels on the rear axle according to manufacturer specifications. With such measurements and any necessary alignment, the truck trailer should track straight.

Figure 11A:
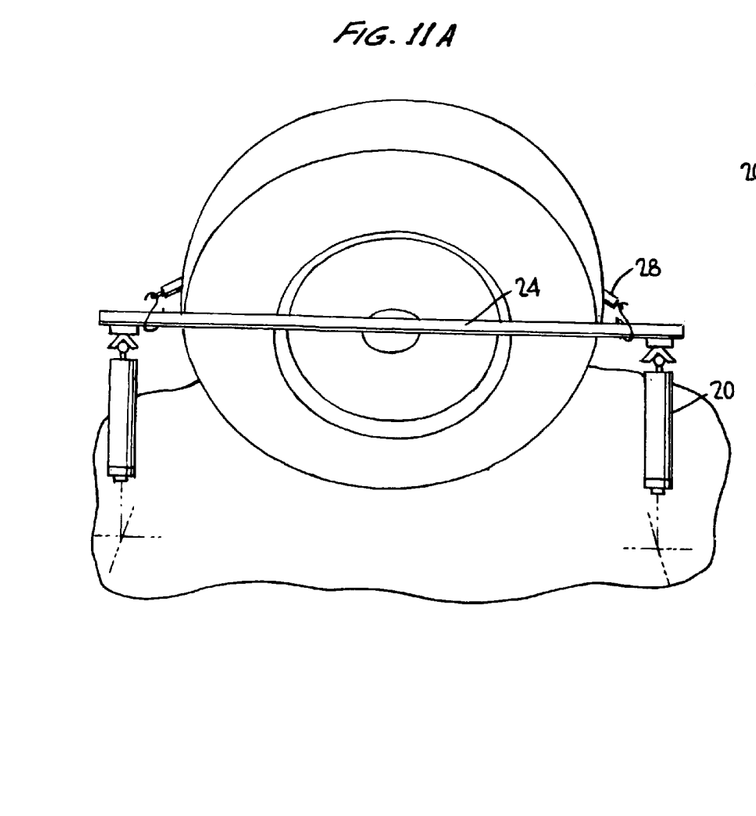
FIGS. 11A-11E are views of the alignment tool in use on the wheels of a truck to align the wheels thereof.

FIGS. 11A-11E illustrate preferred embodiments of using the alignment tool to align the wheels of a tractor trailer truck. In these embodiments, all that is necessary is four of the SL Lasers 20, two straight steel bars ("bar") 24, two bungee cords 28 to hold the steel bars in place and a measuring tape (not shown). In certain of these preferred embodiments, as best shown in FIG. 11A, a bar is secured to the outside of a wheel of a vehicle with the bungee cord (although other attachment means may be used) so that the bar is substantially horizontal and parallel to the ground.

Figure 11B:
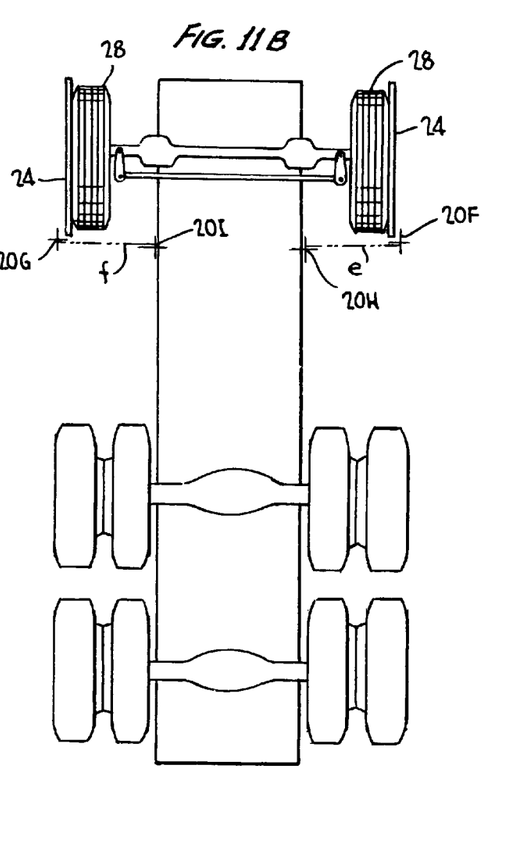

Referring to FIG. 11B, the alignment tool is used to determine the alignment of the front wheels with the frame of the truck. Steel bars 24 about three feet or longer are fastened to the outside of the front wheels of the steering axle with bungee cords 28. SL Lasers 20F and 20G are attached on the rear of the bars 24 on the front wheels, i.e. by the magnets 68 in the tool. Next, SL Lasers 20H and 20I are attached on the outside of the truck frame behind the front wheels. SL Lasers 20E-20I are self-leveling and hang substantially vertically to the ground. The Lasers are then turned on to provide alignment points "+" on the ground for checking the alignment. The user then measures between SL Lasers 20F and 20H to provide a measurement e and SL Lasers 20G and 20I to provide a measurement f. The steering wheel of the truck is then turned until the user gets the same measurement on the right and left wheel from the frame. Using the alignment tool in this method, the user then knows that the front wheels are aligned to the frame of the truck. If the measurements indicate that the front wheels are out of alignment, the alignment is adjusted to factory specifications by standard alignment techniques.

Figure 11C:
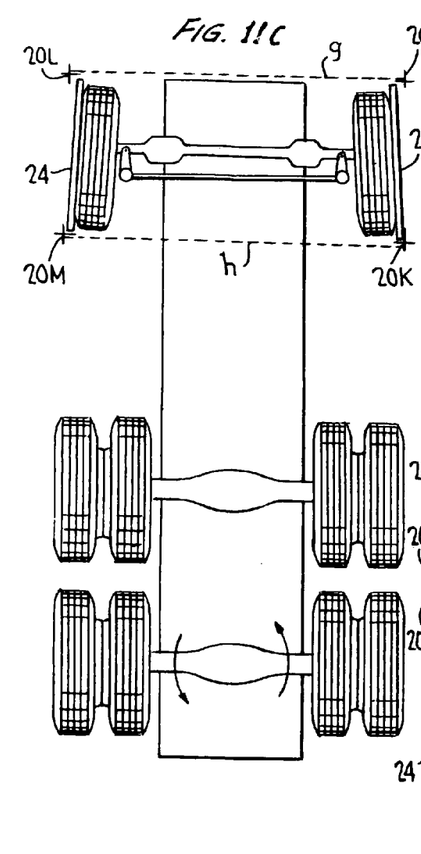

In reference to FIG. 11C, the user may set the toe of the truck tractor to factory specifications. Like FIG. 11B, steel bars 24 are attached to the front wheels of the steering axle with bungee cords 28. SL Lasers 20J-20M are attached at each end of the bars 24. Thereafter, measurements are taken from SL Laser 20J to SL Laser 20L to provide measurement g and from SL Laser 20K to SL Laser 20M to provide measurement h. These measurements will establish whether the toe is properly set. If not, the toe is set to factory specifications using standard alignment techniques.

Figure 11D:
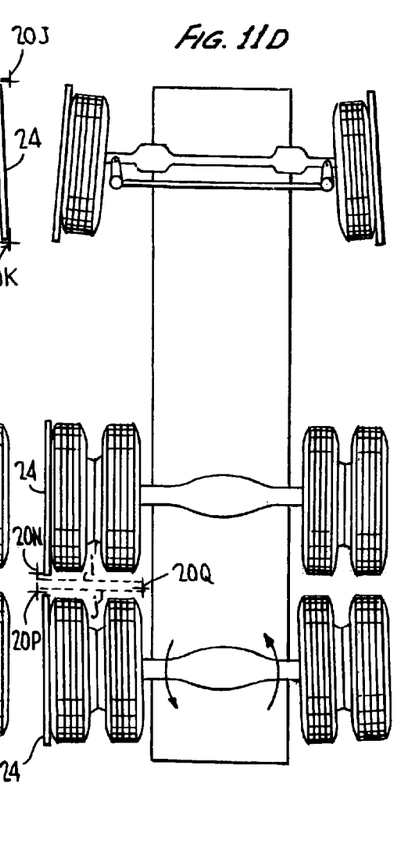

Referring now to FIG. 11D, the user may use the alignment tool to determine whether the rear wheels of the truck are in alignment with the truck frame. This may be done for the right and left side wheels of the truck. FIG. 11D illustrates the measurement on the left side of the truck with the understanding that use of the alignment tool will be the same for the right side of the truck. Steel bars 24 are attached to the left outside rear wheels of the truck by bungee cords 28. SL Laser 20N is attached on the rear face of steel bar 24 on the front drive axle and SL Laser 20P is attached on the front face of the steel bar 24 on the rear axle. A SL Laser 20Q is attached to the outside of the truck frame between the wheels of the two rear axles. Thereafter, the user measures from the front axle SL Laser 20N to SL Laser 20Q on the frame to provide measurement i; and from the rear axle SL Laser 20P to SL Laser 20Q on the frame to provide measurement j. If the rear wheels are not in alignment with the truck frame, the alignment is adjusted to factory specifications using standard alignment techniques.

Figure 11E:
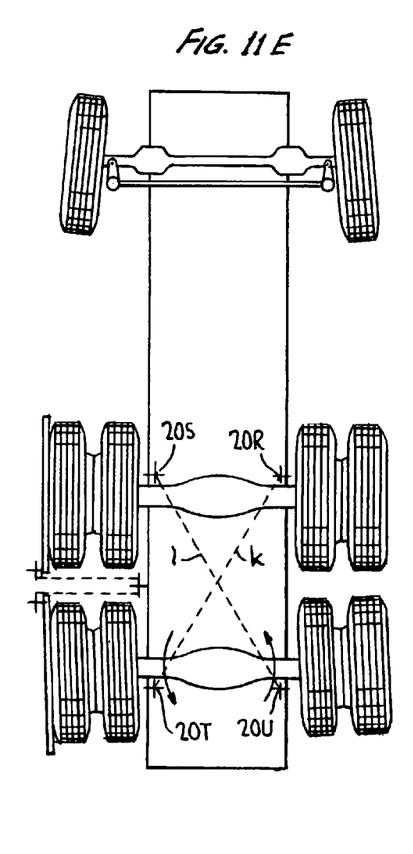

Referring to FIG. 11E, the user may use the alignment tool to ensure that the tractor tracks straight with the frame. SL Lasers 20R and 20S are attached at an equal distance from the closest point to the wheels on the front of the front drive axle. Next, SL Lasers 20T and 20U are placed on the rear side of the rear axle from the closest point to the wheels. Thereafter, SL Lasers 20R-20U are turned on to provide measuring point "+" and perpendicular (cross) measurements k and l are taken to determine whether the tractor tracks straight with the frame. If the alignment is not in accord with factory specifications, the wheels are so aligned.

Figures 12, 13, 14:
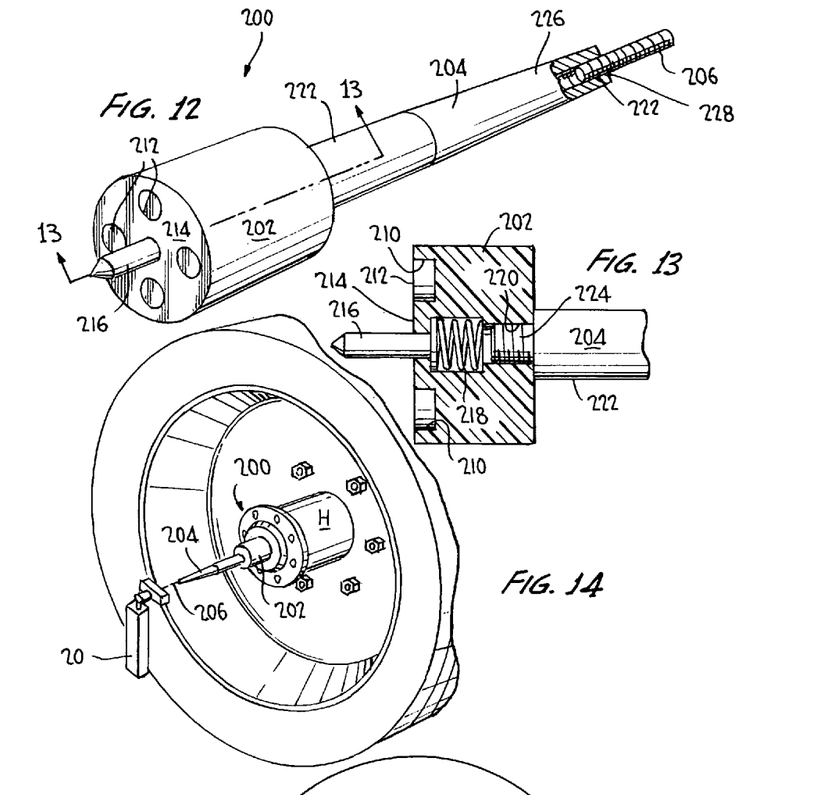
FIG. 12 is a perspective view of a rear axle hub adapter for attaching a Laser.
FIG. 13 is a partial cross-sectional view of the rear axle hub adapter along line 13-13 of FIG. 12.
FIG. 14 is a perspective view of the rear axle hub adapter attached to a wheel and having a Laser attached thereto.

As an alternative to using steel bar 24 and bungee cord 28 as referred to above, other accessories may be used for attaching Laser 20 to a truck wheel as shown in FIGS. 12-18. Two accessories are shown in these Figures, namely a rear axle hub adapter 200 as shown in FIGS. 12-14 and a lug nut adapter 300 as shown in FIGS. 15-18. Trucks and truck trailers usually have rear wheels through which the axle is exposed. In such case, rear axle hub adapter 200 may be used for attaching Laser 20. Front wheels of trucks usually do not have an exposed axle and in such instances lug nut adapter 300 is used for attaching one or more Lasers 20.

Referring to FIGS. 12-14, the rear axle hub adapter 200 includes a housing 202, shaft 204 and connecter 206. As seen in FIG. 14, Laser 20 is attached to rear axle hub adapter 200.

The housing 202 is preferably made of hard plastic, although other materials such as metal may be used. Housing 202 includes one or more recesses 210 to receive magnets 212. Magnets 212 are held in place in recesses 210 by any suitable means, including friction fit, an adhesive, a retaining member or a combination thereof, and they are preferably seated slightly below the outer surface 214 of the housing. This will prevent damage to the magnets. The magnets engage the metal axle hub H as seen in FIG. 14. Housing 202 further includes pin 216 which is spring loaded with spring 218. Since rear wheel axles usually include an aperture at the center of the hub, pin 216 is inserted in this aperture and aligns rear axle hub adapter 200 at the center of the hub. When the rear axle does not include a center aperture, the pin 216 is depressed into housing 202 via spring 218 and magnets 212 engage the rear axle. Housing 202 further includes an opening 220 for receiving shaft 204. The opening includes threads to engage corresponding threads of shaft 204.

Shaft 204 is made of a sturdy material, preferably aluminum or plastic. At end 222 of shaft 204 is a threaded portion 224 for engaging the threads in opening 220. At opposite end 226 of shaft 204 is an opening 228 for receiving connector 206. This opening includes threads for threadably engaging connector 206. Connector 206 may be integral with shaft 204 without departing from the scope of the invention. Connector 206 is preferably threaded throughout for engaging the threads in opening 228 of shaft 204 and for engaging threads 232 of Laser 20.

Referring now to FIGS. 15-18, lug nut adapter 300 includes base plate 302, lug nut grips 304, bar 306 and level 308. Base plate 302 includes a plurality of openings 310 through which bolts 311 will engage lug nut grips 304. The openings 310 are spaced to allow lug nut adapter 300 to fit on various size wheels, e.g. 6, 8 or 10 lug wheels. Lug grip 304 includes an opening 312 to engage a lug nut. The opening is preferably sized larger than the lug nut and can be of various shapes, including circular, rectangular, or shaped to conform to the lug nut. Lug nut grip 304 further includes an aperture 314 for receiving a bolt 316 to grip the lug nut and hold lug nut adapter 300 in place.

Figure 15:
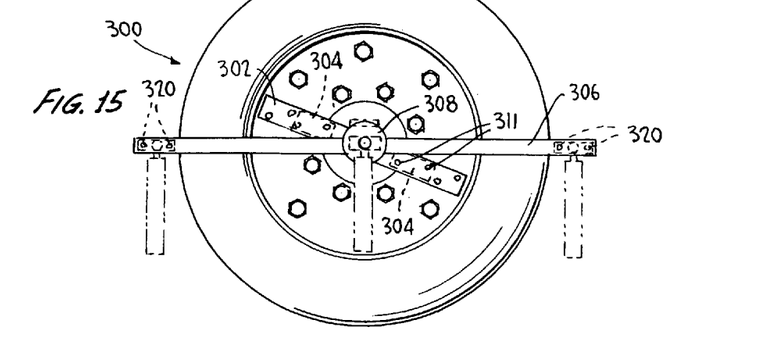
FIG. 15 is a perspective view of a lug nut adapter for attaching a Laser.
Figure 16:
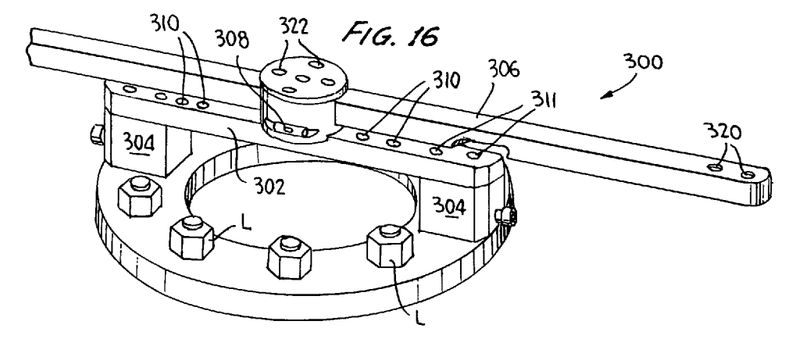
FIG. 16 is another view of the lug nut adapter.
Figure 17:
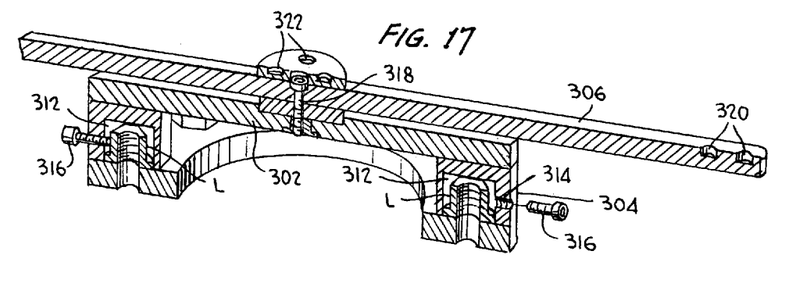
FIG. 17 is a partial cross-sectional view of the lug nut adapter.

Bar 306 is connected to base plate 302 by bolt 318. Bar 306 includes recesses 320 at each end thereof for engaging magnets 68 of Laser 20. At the center of bar 302 are further recesses 322 which may also engage magnets 68 of Laser 20.

Bar 306 further includes level 308. Level 308 indicates whether the bar 306 is level prior to attaching Laser 20.

As seen in FIGS. 15-17, lug grips 304 are placed over lug nuts L and bolt 316 is tightened to engage lug grips 304 with lug nuts L. Base plate 302 is secured to lug grips 304 by bolts 311 through the openings 310 in the base plate. The bar 306 is level as shown in FIG. 15 and may receive Laser 20 at laser mounts 320 at each end of the bar or at 322 in the center of the bar as shown in phantom lines at FIG. 15.

Figure 18:
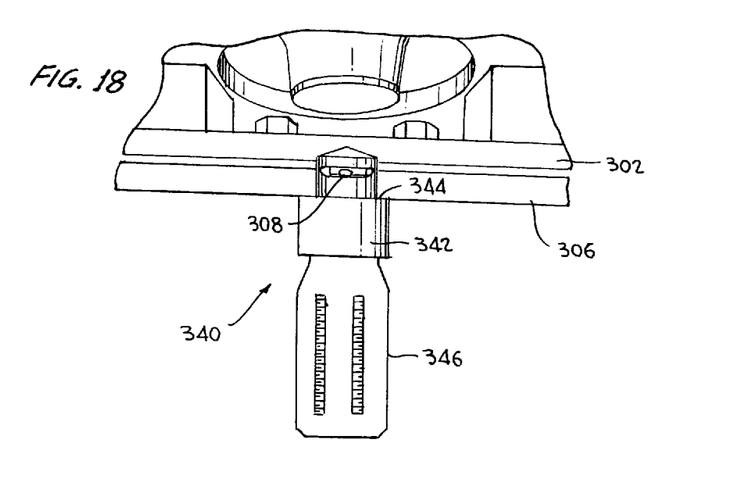
FIG. 18 is a partial perspective view of an instrument adaptor attached to the lug nut adapter.

Referring to FIG. 18, FIG. 18 includes a further known adapter accessory 340 which includes a housing 342 and magnet 344 (not shown) for engaging lug nut adapter 300. An alignment accessory 346 such as a camber/caster gauge may be attached to the lug nut adapter.

As set forth above, the lug nut adapter 300 may be used in place of bar 24. An example of the use of rear axle hub adapter 200 and lug nut adapter 300 is when checking the scrub angle of a truck. When checking the right wheels of the truck, the lug nut adapter 300 will be attached to the right front wheel of the truck with a Laser 20 attached at recesses 322. Rear axle hub adapters 200 will be placed on each of the two right rear axles of the truck with a Laser 20 attached to each adapter. The user will take measurements from the Laser 20 attached at the center of the right front wheel to the closest rear back wheel Laser 20 and from the closest right rear back wheel Laser 20 to the furthest right rear back wheel Laser 20. The angle will then be set to the manufacturer's specifications. Checking the left truck wheels is the same.

Another use of the rear axle hub adapters 200 is to check the drive axle offset. An adapter 200 will be attached to the first right rear axle of the truck and a second adapter 200 to the second right rear axle of the truck, each having attached thereto a Laser 20. Then the user will measure the distance from parallel line of the Laser 20 to each of the right rear axles. Checking the left truck rear wheels is the same.

As seen above, the alignment tool and method of using the alignment tool of the present invention enable the user, for example, the maintenance supervisor for a fleet for tractor trucks and trailers, to make various measurements to check the alignment of the wheels of a vehicle and thereafter make any necessary adjustments to the alignment. This may be accomplished in a quick and simple manner with a tool costing a fraction of the price of current tools. Accordingly, for example, the alignment tool of the invention may be sold in a kit comprising a carrying case, four SL Lasers, two fifth wheel adaptors and a measuring tape. The user will supply the standard straight steel bars and bungee cords.

While the preferred wheel alignment measurements have been described above, any other suitable wheel alignment measurements may be taken using the alignment tool assembly of the present invention.

Additionally, the alignment tool is not necessarily limited to wheel alignment and may be used for alignment in other fields such as setting floor tile.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. For example, the preferred embodiment of the SL Laser uses a ball and socket attachment member to provide the self-leveling feature of the tool. Other attachment members may be utilized to self-level the Laser. Such modifications being within the ability of one skilled in the art form a part of the present invention and are embraced by the appended claims.

It is claimed:

1. An alignment tool for checking alignment of a vehicle or a trailer comprising at least one self-leveling tool for attachment at only one end of the tool to said vehicle or said trailer wherein said self-leveling tool when operatively attached to said vehicle or said trailer is substantially vertical to the supporting surface of said vehicle or said trailer.

2. The alignment tool according to claim 1 wherein said self-leveling tool comprises a housing, a means for attaching said tool to said vehicle or said trailer and a laser light.

3. The alignment tool according to claim 2 wherein said attachment means comprises a housing having at least one magnet for attachment to said vehicle or said trailer.

4. The alignment tool of claim 3 wherein said attachment means further comprises a ball member and socket member which are constructed and arranged to allow said self-leveling tool to self level when said alignment tool is attached to said vehicle or said trailer.

5. The alignment tool of claim 2 wherein said laser light comprises a light which provides a "+" marking and a ball joint constructed and arranged to maintain said laser light in alignment.

6. The alignment tool of claim 4 wherein said laser light comprises a light which provides a "+" marking and a ball joint constructed and arranged to maintain said laser light in alignment.

7. The alignment tool of claim 1 further comprising an additional means for attaching said self-leveling tool to said vehicle or said trailer.

8. The alignment tool of claim 7 wherein said additional means for attaching said self-leveling tool to said vehicle or trailer is selected from the group consisting of a steel bar and bungee cord, a rear hub axle adapter and a lug nut adapter.

9. An alignment tool for taking measurements comprising a self-leveling laser light having a housing, a means for attaching said laser light to an object and a laser light, wherein said attachment means further comprises a ball member and socket member which are constructed and arranged to allow said self-leveling laser light to self level when said alignment tool is attached to said object.

10. The alignment tool according to claim 9 wherein said attachment means comprises a housing having at least one magnet for attachment to said object.

11. A rear axle hub adapter for attachment to a vehicle axle comprising a housing, a shaft and a means for attaching an alignment tool, said alignment tool comprising a self-leveling tool for attachment at only one end of the tool to a vehicle wherein said self-leveling tool when operatively attached to said vehicle is substantially vertical to the supporting surface of said vehicle.

12. A rear axle hub adapter according to claim 11 wherein said housing includes at least one magnet.

13. A rear axle hub adapter according to claim 12 wherein said housing further comprises a spring-loaded pin.

14. A rear axle hub adapter according to claim 11 wherein said shaft is constructed and arranged for attachment to said housing by thread means.

15. A lug nut adapter for attachment to one or more vehicle lug nuts comprising a base plate, means for attachment to said one or more lug nuts, and means for attaching one or more alignment tools, said one or more alignment tools comprising a self-leveling tool for attachment at only one end of the tool to a vehicle wherein said self-leveling tool when operatively attached to said vehicle is substantially vertical to the supporting surface of said vehicle.

16. A lug nut adapter according to claim 15 wherein said means for attaching said one or more alignment tools comprises a bar having recess means for engaging said one or more alignment tools.

17. A lug nut adapter according to claim 16 wherein said bar includes a level.

* * * * *